United States Patent Office 2,933,406
Patented Apr. 19, 1960

2,933,406

PROTEIN AND NONIONIC AGENT COMPOSITIONS

Harold K. Salzberg, Bainbridge, N.Y., and Clifford J. King, Mexico City, Mexico, assignors to The Borden Company, a corporation of New Jersey No Drawing. Application September 11, 1957
Serial No. 683,225

9 Claims. (Cl. 106—125)

This invention relates to a protein composition including an agent for releasing microscopic bubbles of gas, in order to eliminate fish-eyes, pinholes, and surface roughness in films and coatings made from the composition.

The application is a continuation-in-part of our application Serial No. 455,339, filed September 10, 1954, for Clay Dispersions, now abandoned.

The invention is particularly useful in coating paper and fabrics and especially paper requiring evenness of surface and freedom from flaws for offset lithography and other uses.

In such coated paper, casein is a usual binder or adhesive film forming component and a filler, such as finely divided mineral material, is present in large amount. The coating film frequently shows bubbles of air, from the aqueous dispersion applied to produce the coating, that become set in the film as it dries until the composition is too stiff or non-flowable to fill the space even if the bubbles eventually escape. Also there are microscopic pinholes (craters extending into the dried film) and surface roughness detectable by rubbing the finger over the surface. Although these imperfections vary in extent from lot to lot of the coated paper and although many expedients have been tried to avoid the difficulties, they still constitute an unsolved problem in making high grade coated paper.

Among the expedients tried is the incorporation of various defoaming agents. These decrease the number of large bubbles of air appearing as visible foam on the aqueous solution of the casein and other materials at the time of their agitation and solution in water. Use of defoamers, however, may sometimes cause a second type of defect to appear in the coating in the form of undispersed defoamers. Such defects are variously referred to as "oil spots" or "fish-eyes."

We have now discovered means and composition for so making the protein solution that the finished dried film is substantially free of fish-eyes and pinholes and is satisfactory in smoothness of surface for exacting uses such as in offset lithography.

Briefly stated our invention comprises the herein described combination of alkali soluble protein and a non-ionic surfactant applied to the protein in such manner as to be difficultly extractable therefrom and, in such association with the protein, to serve as a release agent for microscopic air bubbles otherwise retained by the protein in aqueous solution and in films made therefrom. The invention includes the process of making this combination and also coatings and films of it.

In general, the bubble release agent is mixed into the protein in dry condition. The mixing is made intimate and is continued until the agent, normally extractable by ether or like organic solvent, becomes more difficultly extractable and in part not extractable at all in usual laboratory extraction technique. After a time, the protein and the thus oiled on agent are dissolved in water. The product so made, when it is to be used for coating paper, for instance, may be mixed with a large proportion of clay filler and coated on paper without creating the difficulties described above. Also, dry gelatin with the agent oiled on and then dissolved may be used to make a solution for use in making films of gelatin supported photographic emulsions.

Once the effects of the nonionic or bubble release agent, applied as described, have been observed, various theories may be advanced to explain the result obtained. We consider that an important part of the result is due to the combination or close association of the said agent with the casein that is established when the two are mixed or rubbed together in the dry state. That the two adhere or remain bound together is shown by the non-extractability of the agent in part after the mixing is completed. As a consequence of the close and remaining association, the agent causes the casein to shed microscopic air bubbles which would otherwise cause the microscopic pinholes and fish-eyes in the finished coating. Also the nonionic agent of kind described acts as a setting retarder for the protein. Thus we have found a longer time of setting of soy proteins, for example, with the nonionic present than otherwise. This gives a longer period as the film or coating composition dries, during which the microscopic bubbles may escape.

More specifically, the period for setting to non-flowable form was lengthened from 600 seconds to 720 seconds in a representative treatment of soy protein and, in the case of an animal glue, to 5 times the setting time for the untreated glue.

As to materials, the protein used is any one that is alkali soluble, that is, soluble in water with alkali in amount to establish the pH at 8-8.5 or moderately higher. Examples are casein, gelatin, and isolated soy protein. The protein may be one that is moisture proofed in advance, as by being worked in damp condition with zinc carbonate or with zinc oxide and ammonium chloride and then dried.

The bubble release agent is a water and ether soluble nonionic surfactant. Examples that are satisfactory and illustrate the general class to be used are the agents selected from the group consisting of water soluble surface active ethers, esters, ether-esters, and ether-alcohols. Specific illustrations of these subclasses are the following: Alkylphenyl (such as octylphenyl) ether of polyethylene glycol; polyoxyethylene thioethers; polyoxyethylene derivative of propylene glycol; sorbitan monolaurate, oleate, or palmitate; glycerine monostearate or laurate; and polyoxyethylene derivatives of any of the esters named above.

The proportion of the oxyalkylene in any of the compositions above may be varied, as from 4-20 units and usually 8-20 per mole of the product. In general, molecular complexity is desirable in the bubble release agent, so long as the agent retains its solubility in water.

Commercial products illustrating the class of bubble release agent and that we have used to advantage are Spans ($C_{12}$-$C_{18}$ higher fatty acid partial esters of hexitol anhydrides), Tweens (polyoxyalkylene derivatives of Spans), Igepal CTA (aromatic polyglycol ether), Pluronics L64 (a liquid polymeric ether-alcohol such as the ethylene oxide derivative of propylene glycol of m.w. about 1500-1800 (corresponding to a molecular weight after alkoxylation of about 3,000) and ethylene oxide content 40%-50%, that may be prepared as described in U.S. Patent 2,677,700), Antarox (aromatic polyglycol ether), Triton 100 (an alkyl aryl polyether alcohol), Sterox (a polyoxyethylene thioether), Myverol (glycerol monostearate), Myrj (polyoxyethylene stearate), Brij (polyoxyethylene lauryl alcohol), Nopalcol (ethylene oxide condensate with a fatty acid), and Surfynol (di-tertiary acetylenic glycol derivatives).

The above agents may be used alone or mixed with each other.

Tributyl citrate, octyl alcohol, tricresyl phosphate, pine oil, and other defoamers of known effectiveness in decreasing macroscopic foam may be used in combination with one or more of the release agents for microscopic bubbles. We have found particularly satisfactory a mixture of equal parts of Pluronics L64, Triton 100, and tributyl citrate. This combination, oiled onto casein before the whole was dissolved in alkaline water, eliminates not only the imperfections described but also the oil spots into which the tributyl citrate, when used without the other agents, tends to concentrate in the final paper coating.

The alkali used to establish an alkaline condition in the coating solution, when the protein is casein or soy protein, is any one that is usual for dissolving the selected protein as, for instance, ammonium hydroxide solution, sodium or potassium hydroxide or carbonate, or borax. The amount of alkali required is usually about 2%–10% of the weight of casein or soy protein. The gelatin composition is used in neutral condition.

When a filler is used, as in making a coated magazine paper, clay is the only filler that we have found to be satisfactory. The clay may be a fine white clay such as china clay or kaolin. With the commonly used precipitated, finely divided calcium carbonate, on the other hand, roughness of surface results.

Auxiliary additives to paper coating colors may include materials to soften the coating and introduce flexibility to the coated sheet, such as glycerol, glycols, or synthetic lattices. The color may also include a low percentage of a protein hardener, designed to moisture-proof the coated sheet, such materials usually coming from the class of aldehydes or metal salts such as aluminum acetate. These auxiliary ingredients are in no way detrimental to the successful performance of the wetting agent in removing microscopic foam pits from the coating.

As to proportions, the following table shows proportions that are used for best commercial results and wider ranges that may be used for some purposes.

| Component | Parts by Weight | |
| --- | --- | --- |
| | Commercial | Permissible |
| Protein, dry weight | 100 | 100 |
| Microscopic bubble release agent | 1–5 | 1–10 |
| Alkali to establish pH | 8–9 | Above 8 |
| Tributyl citrate | 1–5 | 1–10 |
| Clay (for paper coating) | 250–500 | 100–2,000 |
| Water | To give desired concentration of solution. | |

The clay is omitted entirely for such purposes as making a casein coating containing no filler or a gelatin photographic film.

As to conditions, the casein or other protein is mixed in powdered and dry condition, that is, at a moisture content not substantially above 15%, with the bubble release agent. We find a little moisture to be helpful at this stage and normally work at about 5%–15% of water on the weight of the selected protein.

Ambient temperatures are satisfactory for the mixing. Conventional equipment is used for the mixing, as for example ribbon or screw conveyor mixers through which the protein is being moved and into which the agent is introduced and the agent distributed in any convenient manner. Such equipment not only mixes but also rubs the bubble release agent on and into the mass of powdered protein. The mixing is continued for a substantial time, as for example 5–60 minutes. In this manner, the agent is so fixed to casein, for example, as to cause interference with subsequent extraction, 20% of the agent so oiled on becoming non-extractable by ether in a representative preparation.

The clay, when used, is best made into a slip before its incorporation, as follows: The clay is first wet with water with the help of a dispersant such as the sodium pyrophosphate or polyphosphates commonly used in industry. The dispersant, present in amount of only a fraction of 1% of the clay, fluidizes the clay-water paste permitting the use of much less water than is otherwise necessary. A typical clay slip may comprise as little as 1 part of water to 2 parts of clay by weight, but usually a somewhat greater proportion of water than this is used.

Titanium dioxide or other pigment may be mixed with the clay.

If a mixture of two or more of the nonionic agents is used, they are suitably introduced together into the dry casein as described.

The invention will be further illustrated by the following specific examples of the practice of it, all proportions here and elsewhere herein being expressed as parts by weight unless specifically stated to the contrary.

EXAMPLE 1

A lactic acid grade of powdered casein and normal analytical values with respect to moisture (about 7%), ash and fat content was treated with a nonionic surface active polymeric ether-alcohol (Pluronics L64). The liquid agent was sprayed onto the casein granules while being tumbled. The agent was prewarmed to a temperature of about 50° C. which reduced its viscosity to the point of easy handling in spraying equipment and then applied as a spray in the proportion of 2 lbs. of the agent to 100 of the casein in the tumbler, all equipment being conventional. The treated casein was dissolved in water using ammonia as the alkali in amount to provide a pH of 8.0 for a 20% solution.

Upon application of a foaming test, based upon rapid agitation of 200 ml. of the solution in a Waring blender, the solution developed only 40 ml. of foam as against 120 ml. by untreated casein of the same lot in a comparable test. This reduction in foam, though desirable, was not the objective sought, however, in treating the casein, as the gross foam is not indicative of the microscopically dispersed air.

A second test was applied, this one on a film of the casein which had been prepared by coating paper at a liquid thickness of 0.02 inch and then drying under room conditions. The film of treated casein, when viewed under the microscope at 25 magnifications, showed only a very few pinholes present. A companion film made from casein that had not been mixed with the L64 revealed numerous pinholes, i.e. microscopic voids in the coating which are undesirable in the usual applications of casein by industry.

EXAMPLE 2

In order to improve the film still further, the nonionic agent L64 was supplemented by the addition of 1 part of tributyl citrate defoamer for 100 of the casein, in the composition of Example 1.

There was complete elimination of pinholes in the casein coating on the paper. There were, however, some "oil spots" due to over-concentration of the tributyl citrate in localized areas.

EXAMPLE 3

Half of the Pluronics L64 of Example 2 was replaced by Triton 100, making the agent oiled onto the casein a combination of equal parts of Pluronics L64, Triton 100, and tributyl citrate.

The resulting product, when dissolved in alkaline water and used as the bond for clay in the coating of paper, produces a film whose surface is free of both the pinholes and oil spots.

EXAMPLE 4

Moisture-proofed zinc casein was prepared by working damp casein 100 parts on the dry basis with zinc carbonate 5 parts, according to U.S. Patent 2,103,153 to Dunham and the granulated product then substituted on an equal weight basis for the casein in the composition and procedure of Example 1.

The final product, used as the binder for clay in the coating of paper for making offset duplicating plates, eliminates pinholes in the coating and also imparts the correct degree of water resistance to the coating.

EXAMPLE 5

The combination of properties referred to in Example 4 was also obtained by treating a dry mixture of 100 parts of casein, 3 of zinic oxide, and 4 of ammonium chloride with the mixture of the three nonionics of Example 10. A solution of the product in water containing ammonia gives a film which, when dried, contains no microscopic voids and furthermore exhibits a substantial degree of resistance to the softening effects of water or water vapor.

EXAMPLE 6

The product of Example 5 which, as a clear protein film had appeared free from pinholes and had shown a high degree of water resistance, was used as the vehicle in a suspension of clay of paper-coating grade, the composition being made up in stages with the proportions of the several components as follows:

A. *Treated casein:*
```
Casein, 24-mesh ------------------------------ 100
Nonionic L64 --------------------------------- 1
Nonionic Triton 100 -------------------------- 1
Defoamer (tributyl citrate) ------------------ 1
Zinc oxide ----------------------------------- 4
Ammonium chloride ---------------------------- 3
```
B. *Casein solution:*
```
Treated casein A ----------------------------- 18.3
Water ---------------------------------------- 89.0
Ammonia, 26° Bé ------------------------------ 2.7
```
C. *Clay coating:*
```
Casein solution B ---------------------------- 50.9
Clay (ASP—600) ------------------------------- 42.1
Water ---------------------------------------- 17.9
```

The coating was of composition and viscosity suitable for application to paper on a commercial roll coater, and was so used to obtain a decorative effect upon this relatively low cost grade of paper.

EXAMPLE 7

Gelatin of photographers' grade, known commercially as UCOPCO Gelatin, was ground to 20-mesh and treated dry with 2 parts of Pluronics L64 and 1 of tributyl citrate for 100 of the gelatin. A second portion of the same gelatin (100 parts) was treated with the combination of 1 part each of Pluronics L64, Triton 100, and tributyl citrate. Water solutions at pH 4.9 of the two treated products and of the untreated gelatin were prepared and films of each cast and dried. The foamed volume values on the solutions and the estimate of pinholes were as follows:

| Treatment | Ex. 2 | Ex. 3 | None |
|---|---|---|---|
| Volume increased due to foam, percent | 40 | 19 | 120 |
| Pinholes | None | None | Many |

It will be noted that the percentage decrease in pinholes was out of proportion to the decrease in total foam.

EXAMPLE 8

In order to ascertain the comparative effect of the treatment with the nonionic Example 1, by the process thereof, upon different types of industrial proteins, casein, isolated soy protein, and powdered animal glue were so treated in the same experiment. Ammoniacal solutions of the products showed the following values as to pH, viscosity, volume increase on agitating in the Waring blender and pinholes in the dried film made from the solutions. These values are set alongside the corresponding values for the untreated proteins in the following table, in order to bring out the substantial improvements resulting from the treatment.

| Properties | Casein | | Soy Protein | | Animal Glue | |
|---|---|---|---|---|---|---|
| | Treated | Untreated | Treated | Untreated | Treated | Untreated |
| 20% solution, pH | 9.5 | 9.5 | 9.6 | 9.5 | 7.0 | 6.9 |
| Viscosity, cps | 2,300 | 4,200 | 500 | 420 | 140 | 130 |
| Volume increase, percent | 8 | 19 | 42 | 61 | 15 | 115 |
| Pinholes in film | None | Some | None | Some | None | Many |

EXAMPLE 9

Casein was treated dry with a nonionic wetting agent in the proportion of 2 parts of Pluronics L64 to 100 parts of casein. Intimate admixture of the agent with the casein was accomplished by passing the mixture through differential speed rolls maintained at an elevated temperature. This processing subjects the ingredients to heat and pressure. The product was used in preparing a clay dispersion containing, for 20 parts dry weight of casein dissolved in ammoniacal water, 98 of clay, 0.2 part of Igepal CTA, 0.34 part of tetrasodium pyrophosphate, and total water 177 parts.

EXAMPLE 10

A dispersion of a widely used paper coating clay in water was combined with a water dispersion of soybean protein which had been previously treated with the nonionic agent, Pluronics L64, and with a well-known defoamer, tributyl citrate. The protein used here is obtained by the extraction with mild alkali of soybean meal. The protein curds out from solution upon treatment with acid and is prepared for commercial use by washing, drying and grinding. 100 parts of the dry powder was "oiled" with 2 parts of Pluronics L64 and 1 part of tributyl citrate, by weight. The treated protein was then dissolved in ammoniated water and solution combined with the clay slip, the ingredients and proportions being:

```
                                                Parts
Clay ASP 600 ------------------------------ 375
Water A ----------------------------------- 375
Tetrasodium pyrophosphate ----------------- 0.75
Treated soy protein ----------------------- 50
Ammonia ----------------------------------- 52
Water B ----------------------------------- 250
```

The resulting liquid coating or "color" was of a viscosity judged suitable for commercial coating of book and magazine paper. A laboratory coating machine was used to apply a coating of 0.02 inch liquid thickness on paper. After drying, the coating surface was examined for pinholes and craters by viewing under a microscope at 20×. None were observed.

EXAMPLE 11

The experiment of Example 10 was repeated using a grade of gelatin such as might be used in coating photographic printing paper, to replace the casein on an equal weight basis. This gelatin served as the pigment binder in the same manner as the other proteins. Again the coating revealed no pinholes or craters when viewed at a magnification of 20×.

EXAMPLE 12

The composition and procedure of Examples 1 and 2 are followed in turn with the replacement of the Pluronics L64 there used by an equal weight of any of the other nonionic bubble release agents described herein and more particularly by any water soluble surface active ether, ester, ether-ester, and ether-alcohol disclosed.

EXAMPLE 13

The composition and procedure of Examples 2 and 12 were followed in turn with the replacement of the tributyl citrate there used by an equal weight of any of the other defoamers described herein, on an equal weight basis.

EXAMPLE 14

The mechanism of release of fine air bubbles in a clay coating which results from treatment of the protein according to our invention is in part the slower rate of gelling of the protein composition as the coating dries on the paper.

Solutions of 50 grams of protein in 244 ml. of water were prepared by heating and cooling. The untreated protein made up one set of solutions and a comparison set was prepared from the same proteins after treatment with a mixture of 2 parts of Pluronics L64 and 1 part of tributyl citrate. The cooled solution was coated onto paper and observed as to gel formation as drying progressed. When the marks of a comb pressed repeatedly into the coating would no longer disappear upon withdrawal of the comb, the coating was judged to have attained gel structure. The paired values in seconds were as follows:

|  | Soy Protein | | Animal Glue | | Photographic Gelatin | |
| --- | --- | --- | --- | --- | --- | --- |
|  | Untreated | Treated | Untreated | Treated | Untreated | Treated |
| Gel Formed (sec.) | 600 | 720 | 120 | 600 | 0 | 26 |

The release of microscopic air bubbles, responsible for pinholes, in a clay coating, would be expected to be faster from a coating in which gel formation on the sheet was delayed; when the coating gels there can be no further escape of bubbles.

The same observation can be made by comparing the viscosity values of liquid coatings made with untreated and treated casein. The lower the viscosity, the more readily can air bubbles escape. The treatment of casein in one experiment with 2% of Pluronics L64 before preparing a clay coating reduced the viscosity of the coating from 4 seconds to 3.2 seconds for 100 revolutions on the Stormer viscometer.

*Extraction of treated casein*

That the nonionic agent reacts to some degree with the dry protein during the treating process is indicated by the results of solvent extraction tests on casein treated with the polymeric glycol ether-alcohol agent (L64) and tributyl citrate (the treatment of Example 2). Whereas ether in the Soxhlet apparatus should have extracted 3.0% of added material (2% of nonionic and 1% of tributyl citrate) plus the extractable fat from the casein, substantially less extract was obtained.

AVERAGE OF ETHER EXTRACTION RESULTS BY SOXHLET AND ROSE-GOTTLIEB TECHNIQUES

|  | Percent |
| --- | --- |
| Extracted from untreated casein | 1.0 |
| Extractable nonionics added to casein | 3.0 |
| Extractable from mixed product, calculated | 4.0 |
| Actually extracted | 2.75 |
| Nonionic material bound by casein | 1.25 |

It is to be understood that it is intended to cover all changes and modifications of the examples of the invention herein chosen for the purpose of illustration which do not constitute departures from the spirit and scope of the invention.

We claim:

1. In making a coating and film forming composition for use in aqueous solution, to leave on drying a film substantially free from microscopic pinholes and other imperfections caused by retained air, the process which comprises mixing an adhesive consisting essentially of alkali soluble protein in dry form containing not more than 15% of water on the weight of the protein and selected from the group consisting of casein, soy protein, and gelatine with a nonionic surfactant serving as a bubble release agent and selected from the group consisting of water- and ether-soluble surface active ethers, esters, ether-esters, and ether-alcohols in the proportion of 1–10 parts by weight for 100 parts of the protein, and maintaining the contact between the protein and the nonionic surfactant and continuing the mixing in dry condition until the agent becomes in part non-extractable from the mixture by ether.

2. The process of claim 1 in which the protein is casein.

3. The process of claim 2 in which the casein and bubble release agent are mixed with clay.

4. A coating and film forming composition comprising a mixture of an adhesive consisting essentially of an alkali soluble protein in dry form containing not more than 15% of water on the weight of the protein and selected from the group consisting of casein, soy protein, and gelatine with a nonionic surfactant selected from the group consisting of water- and ether-soluble surface active ethers, esters, ether-esters, and ether-alcohols in the proportion of 1–10 parts by weight for 100 parts of the protein, the surfactant being in part non-extractable from the mixture by ether and serving in aqueous solution of the said composition as a release agent for microscopic air bubbles and the composition being the product of the process of claim 1.

5. A paper coating composition including the composition of claim 4 and finely divided clay admixed thereinto in the proportion of 100–2000 parts by weight for 100 parts of the protein.

6. The composition of claim 4, the protein being casein.

7. The composition of claim 4, the protein being casein and the nonionic surfactant being a polymeric ether-alcohol of mean molecular weight about 3000 and ethylene oxide content about 40%–50% of the weight of the surfactant.

8. The process of claim 1 which includes mixing into the said composition a defoamer selected from the group consisting of tributyl citrate, octyl alcohol, tricresyl phosphate, and pine oil.

9. The composition of claim 4, the said protein being gelatine.

References Cited in the file of this patent

UNITED STATES PATENTS

| 2,220,700 | Atwood | Nov. 5, 1940 |
| 2,695,892 | Jaccard et al. | Nov. 30, 1954 |
| 2,709,689 | Herzog | May 31, 1955 |
| 2,776,904 | Brown | Jan. 8, 1957 |
| 2,810,655 | Dean | Oct. 22, 1957 |
| 2,831,766 | Knox et al. | Apr. 22, 1958 |